United States Patent [19]
Nakada et al.

[11] 3,723,690
[45] Mar. 27, 1973

[54] SPARK EROSION OF MATERIALS

[75] Inventors: Yoshinao Nakada, Emmaus, Pa.; David Gilbert Thomas, Summit, N.J.

[73] Assignee: Bell Telephone Laboratories, Incorporated, Murray Hill, N.J.

[22] Filed: Aug. 9, 1971

[21] Appl. No.: 169,970

[52] U.S. Cl. .................219/69 M, 219/137, 219/384
[51] Int. Cl. ..........................B23p 1/08, H05b 7/18
[58] Field of Search ....219/68, 69 E, 69 M, 69 V, 70, 219/121 EB, 121 EM, 383, 384

[56] References Cited

UNITED STATES PATENTS

| | | | |
|---|---|---|---|
| 2,939,941 | 6/1960 | Heerschap et al. | 219/69 M |
| 1,194,124 | 8/1916 | Barrow | 219/68 X |
| 2,785,280 | 3/1957 | Eisler et al. | 219/69 V |
| 3,119,919 | 1/1964 | Pratt | 219/384 |

*Primary Examiner*—R. F. Staubly
*Attorney*—R. J. Guenther et al.

[57] ABSTRACT

A method is described for the spark erosion of certain insulators and semiconductors such as $Al_2O_3$ and SiC involving forming a metal layer on the surface of the material to be eroded, positioning a movable electrode above the surface, initiating electrical sparking across the gap between the electrode and the metal layer, and then advancing the electrode toward the surface so as to maintain sparking, resulting in spark erosion of the surface. The method enables the implacement of holes of a variety of shapes and sizes at erosion rates of about 3 to 10 micrometers per second.

6 Claims, 3 Drawing Figures

SPARK EROSION OF MATERIALS

BACKGROUND OF THE INVENTION

1. Field of the Invention

This invention relates to the spark erosion of certain electrical insulators and semiconductors and more particularly to the machining by spark erosion of certain electrical insulators and semiconductors having resistivities at room temperature greater than 100 ohm-centimeters.

2. Prior Art

The machining of many non-conductors by present machining techniques often proves to be tedious and time consuming due to the mechanical hardness and brittleness of these materials. Moreover, these conventional machining techniques often have peripheral disadvantages when used in certain specialized applications. For example, in the thin film electronics field, multilayer substrate applications require alumina or other substrates with accurately implaced holes. Lasers are currently used to implace such holes in many alumina substrates. However, due to power limitations, the diameter of holes which can be implaced by lasers is limited. For example, for an alumina substrate having a thickness of about 625 micrometers, the maximum diameter of holes which may be drilled by ruby and $CO_2$ lasers is about 325 micrometers.

Other methods of drilling holes in these materials include ultrasonic drilling and mechanical drilling, such as with a diamond or carbide tipped drill. Both methods in general slower and less accurate than laser drilling. For example, drilling of a 325 micrometer diameter hole in a 625 micrometer thick alumina substrate would take about 1 minute for mechanical drilling and about 5 minutes for ultrasonic drilling, while only about one-half second would be required for laser drilling. In addition, mechanical drilling has other disadvantages, such as a tendency to form craters in the bottom surface of the drilled substrate, and the necessity of frequent replacement of the mechanical bits (e.g., replacement is typically required after the drilling of only about five to 10 holes in $Al_2O_3$ substrates), leading to expense and inconvenience.

The most economical way to implace holes in alumina substrates is to punch them into the flexible "green" (unsintered) alumina. However, due in large part to uneven shrinkage during sintering, the accuracy of hole location by this method is currently no better than about ±0.50 percent, which is unsatisfactory for most thin film multilayer substrate applications.

In British Pat. No. 851,309 there is described a method for eroding diamond involving heating the diamond to graphitize its surface followed by contacting the graphitized zone with two spaced electrodes in a liquid dielectric and impression of a voltage so as to cause sparking between one electrode and the surface, and consequent spark erosion of the surface. Apparently, the heat generated by sparking results in graphitization of the eroded surface enabling further erosion. Unfortunately, this technique is inapplicable to materials other than diamond.

SUMMARY OF THE INVENTION

Certain insulating and semiconducting materials may be eroded by: first, forming a metal layer on the surface of the material to be eroded; second, positioning a movable electrode above the surface to be eroded so that a gap of at least 0.0015 millimeter is formed between one end of the electrode and the metal surface; third, applying a potential of at least 50 volts across the gap so as to cause sparking and to initiate erosion; and fourth, gradually moving the electrode or the material so as to maintain an approximately constant gap distance between them resulting in continued sparking and consequent continued spark erosion.

By employing suitably shaped and sized electrodes, a variety of machining operations may be performed including drilling holes of a variety of shapes and sizes.

In a preferred embodiment, an array of elongated electrodes are employed to simultaneously implace an array of circular holes in a material.

In another preferred embodiment, spark erosion is carried out under a dielectric liquid such as water or kerosene.

Materials eroded by the method are intended to be a part of the invention.

DETAILED DESCRIPTION

It is critical to the achievement of the erosion of a metallized material to initiate and maintain a conducting, molten layer of the material which completes the electrical circuit from the electrode to the surface metallization. Initially, electrical discharge, or sparking, between the electrode and the metallized layer results in melting of the metallized layer in the vicinity of the electrode tip. The thickness of the metallized layer should be such as to allow the generation of sufficient heat to melt a portion of the surface of the material. A thickness of at least 50,000 A has been found to be adequate for this purpose. A thicker layer could, of course, be used, the upper limit being determined only by the costs involved and the additional time required to form the layer and to remove it.

As the electrode enters the work piece, the electrical sparking continues, principally at the electrode tip. Thus, the molten layer on the wall of the hole must be kept molten by the heat generated at the tip of the electrode. If the molten layer near the top surface freezes, the electrical circuit will be broken. The freezing of the molten layer depends largely on the speed of heat extraction from the molten material by conduction through the solid insulator. Thus, the higher the thermal conductivity, the more difficult it is to drill a substrate.

Thus, in general, it has been found that insulating and semiconducting materials (herein defined as those materials having a resistivity at room temperature of greater than 100 ohm-centimeters) having resistivities in the molten state of less than 100 ohm-centimeters and having solid state thermal conductivities of less than 0.10 (cal/sec. cm. °K) near the melting point (within 50° C thereof) may be eroded in accordance with the inventive technique.

Figure 1:
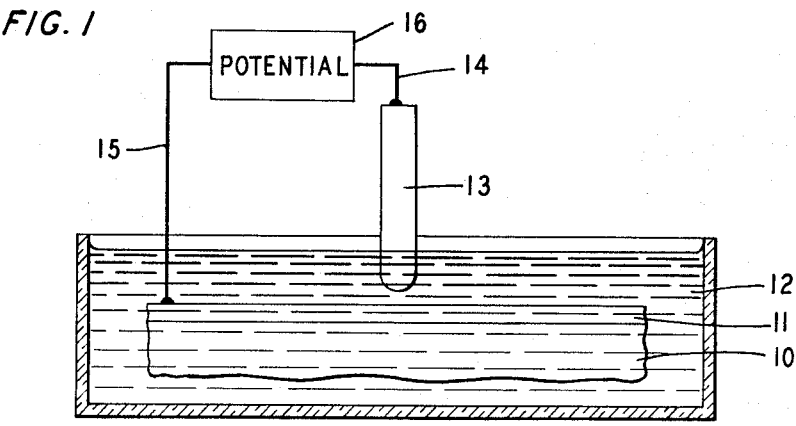
FIG. 1 is a schematic illustration of a preferred arrangement for achieving spark erosion by the inventive method.

Referring now to FIG. 1, there is shown schematically one arrangement for eroding material in accordance with the invention. Body 10 is covered by metal layer 11 (such as gold or copper), formation of which may be by any suitable technique such as vacuum evaporation, sputtering, electroplating, etc.

It has been found that the metal layer need be formed only in the immediate area surrounding the area to be eroded provided the electrical lead 15 to the potential source is attached to the metal layer at a point sufficiently far removed from the area to be eroded so as to obviate the possibility of sparking between the electrode and the lead. In general, a distance between the electrode and the lead of at least five times the diameter of the electrode is satisfactory for this purpose.

In FIG. 1 the body 10 and the metal layer 11 are covered by dielectric liquid 12 whose purpose is to aid in controlling sparking and to aid in cooling body 10. Furthermore, when circulated, the liquid tends to keep the erosion area free of chips and other eroded particles. The dielectric liquid may be any of those commonly available such as water, kerosene, or transformer oil. While a dielectric liquid is preferred to be used for the reasons stated, such a liquid is not essential. For example, an inert gas such as one of the rare gases, He, Ne, or Ar may be used as the dielectric medium.

Movable electrode 13 is positioned above the surface to be eroded. The gap and the voltage should be adjusted so as to maintain an erosion rate sufficiently high to be commercially expedient and to maintain sparking. For the materials described, it has been found that an erosion rate of at least three micrometers per second is satisfactory, which rate may be maintained using a gap of at least 0.0015 millimeters and a voltage of at least 50 volts. It is preferred to advance the electrode toward the workpiece in the desired direction of erosion in a manner which results in an approximately constant gap distance. Apparatus designed for the electric discharge machining of metals and having the capability for maintaining a constant voltage and gap distance during erosion is commercially available, and may be readily adapted for use in machining the materials described herein.

Figure 2:
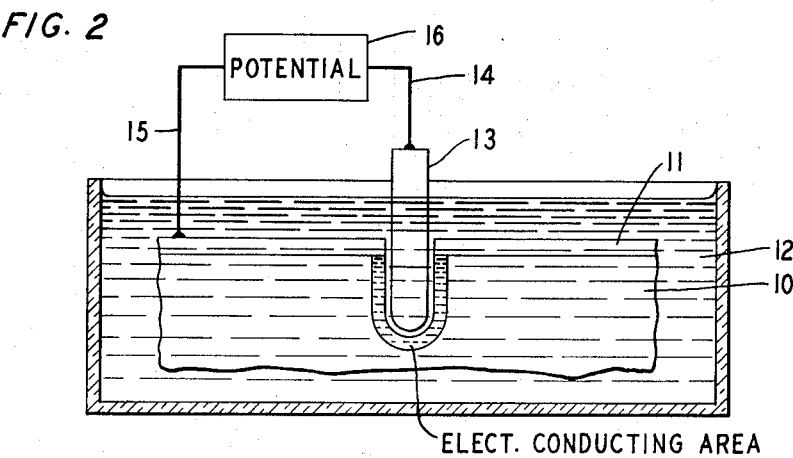
FIG. 2 is a schematic diagram similar to that of FIG. 1, showing the insulator body partially eroded.

Referring now to FIG. 2 there is shown the arrangement of FIG. 1 after sparking has continued for a time sufficient to cause partial erosion of body 10.

Figure 3:
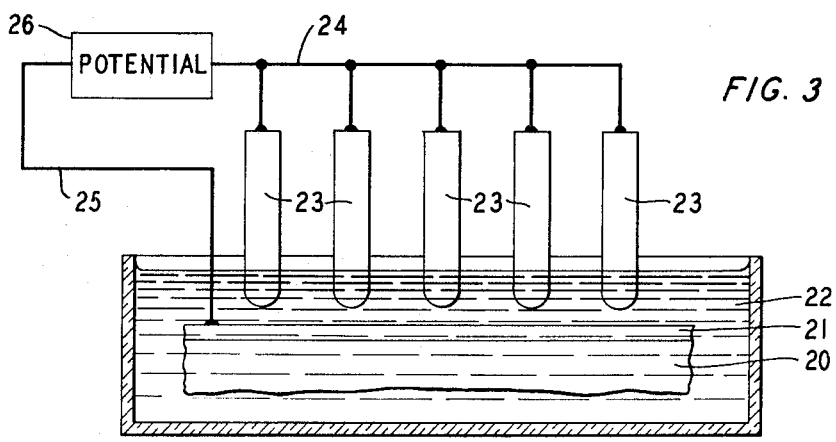
FIG. 3 is a schematic diagram showing an arrangement including an array of electrodes for simultaneously eroding an insulator body at several locations.

Referring now to FIG. 3 there is shown another arrangement for eroding materials in which body 20, supporting metal layer 21, is placed under dielectric liquid 22. An array of electrodes 23 is interconnected and connected to a potential source 26 by leads 24. Source 26 is in turn connected to metal layer 21 via lead 25. By this arrangement an array of holes may be eroded in body 20 simultaneously.

EXAMPLE 1

An alumina substrate 625 micrometers thick was obtained and a gold film about 80,000 A thick was vacuum evaporated onto one surface thereof. The substrate was then immersed in kerosene. A molybdenum wire about 625 micrometers in diameter was used as the spark electrode. The electrode was placed in a servomechanism and positioned above the metal layer so that a gap distance of about 0.0015 millimeter was formed between the end of the electrode and the metal layer. A potential of about 50 volts was then applied between the electrode and the gold film to cause sparking and the electrode was then advanced into the substrate by the servomechanism. The electrode pierced the substrate in about 1 minute, resulting in an erosion rate of about 10.4 micrometers per second. The entrance hole diameter was about 1,400 micrometers and the exit hole diameter was about 1,000 micrometers. The electrode wear was about 1 millimeter.

EXAMPLE 2

The procedure of Example 1 was followed for a silicon carbide substrate 175 micrometers thick upon one surface of which had been formed a copper layer about 250,000 A thick. Kerosene was used as the dielectric liquid. A hole was drilled through the silicon carbide substrate in about 40 seconds, resulting in an erosion rate of about 4.3 micrometers per second.

These examples serve to illustrate the applicability of the inventive method to the drilling of holes in hard, brittle materials. A variety of other machining operations may also be performed on a variety of other materials as will be appreciated by those skilled in the art. Holes and other cavities of various shapes and sizes may be formed, and other machining operations performed by employing one or a plurality of electrodes of the appropriate shape and size. For example, an electrode or an array of electrodes having a triangular cross-section will produce by this method a hole or cavity having a triangular cross-section or an array thereof.

What is claimed is:

1. A method for eroding holes in a thin laminar body of material having a solid state resistivity greater than 100 ohm-centimeters, a molten state resistivity of up to 100 ohm-centimeters, and a solid state thermal conductivity of up to 0.10 (cal/sec. cm. °K) within 50° C of the melting point of the body, comprising:

forming a layer of a metal on the surface of the body to be eroded, contacting the layer with a dielectric medium, positioning one end of at least one electrode in close proximity to the metal layer so as to form a gap between the electrode end and the metal layer, applying an electrical potential between the electrode and the metal layer, said potential being of sufficient magnitude to cause sparking between the electrode and the metal layer, and advancing the electrode toward the surface to be eroded so as to create sparking between the electrode and the surface, resulting in spark erosion of the surface.

2. The method of claim 1 in which the erosion rate is at least 3 micrometers per second, the gap is at least 0.0015 millimeters, and the potential is at least 50 volts.

3. The method of claim 1 in which prior to spark erosion the surface of the body to be eroded is contacted by a dielectric liquid.

4. The method of claim 1 in which the metal layer is selected from the group consisting of copper and gold.

5. The method of claim 1 in which a plurality of electrically interconnected electrodes are provided to simultaneously erode the body at a plurality of locations.

6. A body of material eroded by the method of claim 1.

* * * * *